United States Patent [19]

Andersen et al.

[11] Patent Number: 4,663,742

[45] Date of Patent: * May 5, 1987

[54] DIRECTORY MEMORY SYSTEM HAVING SIMULTANEOUS WRITE, COMPARE AND BYPASS CAPABILITES

[75] Inventors: John E. Andersen, LaGrangeville; Robert L. Barry, Pleasant Valley; Kenneth H. Christie; Dennis J. Shea, both of Hopewell Junction, all of N.Y.

[73] Assignee: International Business Machines Corporation, Armonk, N.Y.

[*] Notice: The portion of the term of this patent subsequent to Oct. 7, 2003 has been disclaimed.

[21] Appl. No.: 666,580

[22] Filed: Oct. 30, 1984

[51] Int. Cl.[4] ............................................. G11C 7/00
[52] U.S. Cl. ...................................... 365/189; 365/49; 364/900
[58] Field of Search ......................... 365/189, 230, 49; 364/200 MS File, 900 MS File

[56] References Cited

U.S. PATENT DOCUMENTS

| | | | |
|---|---|---|---|
| 3,238,510 | 3/1966 | Ergott, Jr. | 364/200 |
| 3,471,838 | 10/1969 | Ricketts, Jr. et al. | 365/194 |
| 3,685,020 | 8/1972 | Meade | 364/200 |
| 3,686,640 | 8/1972 | Anderson et al. | 364/900 |
| 3,723,976 | 3/1973 | Alvarez et al. | 364/200 |
| 3,761,881 | 9/1973 | Anderson et al. | 364/200 |
| 3,761,898 | 9/1973 | Pao | 365/190 |
| 3,787,817 | 1/1974 | Goldberg | 364/200 |
| 3,800,289 | 3/1974 | Batcher | 364/200 |
| 3,858,187 | 12/1974 | Lighthall et al. | 365/202 |
| 3,906,458 | 9/1975 | Ehlers | 364/900 |
| 3,958,222 | 5/1976 | Messina et al. | 364/200 |
| 3,967,251 | 6/1976 | Levine et al. | 364/200 |
| 4,044,338 | 8/1977 | Wolf | 364/900 |
| 4,070,657 | 1/1978 | Fett | 365/233 |
| 4,075,686 | 2/1978 | Calle et al. | 364/200 |
| 4,087,853 | 5/1978 | Kashio | 364/200 |
| 4,136,385 | 1/1979 | Gannon et al. | 364/200 |
| 4,138,738 | 2/1979 | Drogichen | 365/94 |
| 4,219,883 | 8/1980 | Kobayashi et al. | 365/189 |
| 4,222,112 | 9/1980 | Clemons et al. | 365/189 |
| 4,238,841 | 12/1980 | Clemen et al. | 365/203 |
| 4,241,425 | 12/1980 | Cenker et al. | 365/222 |
| 4,268,907 | 5/1981 | Porter et al. | 364/200 |
| 4,286,173 | 8/1981 | Oka et al. | 307/440 |
| 4,332,010 | 5/1982 | Messina et al. | 364/200 |
| 4,460,984 | 7/1984 | Knepper | 365/190 |

OTHER PUBLICATIONS

T. A. Williams, "High-Speed Random-Access Memory With Simultaneous Read/Write Operation", IBM Technical Disclosure Bulletin, vol. 17, No. 3, Aug., 1974, pp. 933–934.

J. Perris et al., "Bit Line Constant Current Source Switch for a Read-Only Store", IBM Technical Disclosure Bulletin, vol. 20, No. 11A, Apr. 1978, pp. 4412–4414.

*Primary Examiner*—James W. Moffitt
*Assistant Examiner*—Glenn A. Gossage
*Attorney, Agent, or Firm*—Douglas A. Lashmit

[57] ABSTRACT

A directory memory system including a plurality of reconfigurable subarrays of memory cells and having the capability of simultaneously performing write/compare, read/compare, compare/bypass, write/bypass, or write/compare/bypass operations. The present system may be fabricated on a single integrated circuit chip and includes circuitry for selectively writing data into the subarrays. Output data from the subarrays is connected to compare data logic for comparing the subarray data to one or more bytes of compare input data, and to bit select logic for selectively placing the subarray data onto an output bus. Bypass select logic causes either the subarray data or one byte of compare data to be output from the memory system data output port. In one embodiment, two bytes of compare input data can be simultaneously compared with a selected data byte from each of the subarrays, and one byte of compare input data can be bypassed to the data output port during the compare operation. Additionally, data may be written into the subarrays while simultaneously performing the compare or the compare/bypass operation.

13 Claims, 5 Drawing Figures

DIRECTORY MEMORY SYSTEM HAVING SIMULTANEOUS WRITE, COMPARE AND BYPASS CAPABILITES

RELATED APPLICATIONS

U.S. application Ser. No. 509,674, now U.S. Pat. No. 4,616,341, entitled "Directory Memory System having Simultaneous Write and Comparison Data Bypass Capabilities", filed June 30, 1983, by J. E. Andersen et al. and of common assignee herewith.

U.S. application Ser. No. 611,564, now U.S. Pat. No. 4,608,667, entitled "Dual Mode Logic Circuit for a Memory Array", filed May 18, 1984, by R. L. Barry and of common assignee herewith.

BACKGROUND OF THE INVENTION

The present invention relates generally to a directory memory system for use in a data processing system having a cache memory, and more particularly to a directory memory system formed in a monolithic integrated circuit having the capability of performing simultaneous write/compare, read/compare, compare/bypass, write/bypass, or write/compare/bypass operations.

Directory memory systems, particularly directory memory systems fabricated in a single integrated circuit chip, have recently found increasing use in high-speed data processing systems. One example of such a directory memory system is described in U.S. Pat. No. 4,219,883 to Kobayashi et al. Such devices can be used advantageously to perform a number of different functions within the data processing system. One example is in a cache memory, which is a small, high-speed memory functionally positioned between a main, slower memory and a central processor. The cache memory stores the most frequently used data retrieved by the processor from the main memory for rapid access by the processor. Another application of a directory memory is in a "trace" system in which a predetermined amount of the data most recently used by the processor is stored for examination to locate possible faults within the data processing system. Many other applications, of course, are possible.

A directory memory system should generally have the capability of performing the functions of writing input data into a memory block for temporary storage therein, reading data from the memory block onto an output data bus, comparing designated portions of the data stored in the memory block with comparison data, and bypassing the comparison data onto the output data bus under certain conditions. The capabilities of directory memories are further enhanced by dividing the memory block array into two or more subarrays which are addressable either individually or in various combinations.

Directory memories which store and compare addresses associated with main and cache memories, and which have a memory array divided into two or more subarrays are well known. Typical systems are disclosed in U.S. Pat. Nos. 3,685,020 to Meade, 3,723,976 to Alvarez et al., 3,761,881 to Anderson et al., 4,044,338 to Wolf, 4,136,385 to Gannon et al., and 4,332,010 to Messina et al. Memory systems having two or more subarrays which are reconfigurable for write and/or read operations are disclosed in U.S. Pat. Nos. 3,686,640 to Andersen et al., 3,787,817 to Goldberg, 3,800,289 to Batcher, 3,958,222 to Messina et al., 4,087,853 to Kashio, 4,222,112 to Clemons et al., and 4,241,425 to Cenker et al. A memory having subarrays is also described in "Bit Line Constant Current Source Switch for a Read-Only-Store" by J. Perris et al., IBM TDB Vol. 20, No. 11A, April 1978, pp. 4412–4414.

Memory systems which have the capability of performing simultaneous operations have been disclosed. For example, systems which simultaneously write data into and read data from a memory array are described in U.S. Pat. Nos. 3,471,838 to Ricketts, Jr. et al., 3,761,898 to Pao, 4,070,657 to Fett, and in an article entitled "High-Speed Random-Access Memory with Simultaneous Read/Write Operation" by T. A. Williams, IBM TDB Vol. 17, No. 3, August 1974, pp. 933-934. Cache memories which perform a bypass function are disclosed in U.S. Pat. Nos. 4,075,686 to Calle et al. and 4,268,907 to Porter et al. A directory memory system including a simultaneous write and bypass function is disclosed in copending U.S. application Ser. No. 509,674, now U.S. Pat. No. 4,616,341, cited above, and a logic circuit having a bypass circuit therein is described in U.S. Pat. No. 4,286,173 to Oka et al.

Several prior directory memory systems are capable of performing simultaneous operations, however, these are limited to either compare, read/write, or write/bypass operations. This limited functionality is disadvantageous in that a greater number of memory or control cycles are required to complete the various operations. Thus, the overall processing speed of a data processing system could be significantly increased by performing additional various combinations of operations simultaneously.

SUMMARY OF THE INVENTION

Accordingly, it is an object of the present invention to provide a directory memory system having the capability of performing simultaneous write/compare, read/compare, compare/bypass, write/bypass, or write/compare/bypass operations.

Another object of the present invention is to provide a directory memory system having the above capabilities which is fabricated on a single integrated circuit chip.

Still another object of the present invention is to provide a directory memory system having a plurality of reconfigurable subarrays into which data may be written in a number of organizations or formats.

These and other objects are met by a directory memory system which, in one embodiment, includes a memory array divided into four subarrays. Two bytes of input data may be written into the subarrays in one of three organizations selectable by a plurality of write-data-in circuits, and a bit driver circuit associated with each subarray. The output of each subarray is connected to a sense amplifier circuit, whose output is hard-wired to a bit select circuit and two compare logic circuits, which allow the data from a selected subarray to be simultaneously compared with two bytes of compare input data. The bit select circuits are selectively enabled by a read byte decoder to place the subarray data onto an array data output bus, which is connected to one data input of an array/bypass data out logic circuit. A second data input of the array/bypass logic circuit receives the compare data from one group of the compare logic circuits. A bypass select logic circuit connected to an enable input of the array/bypass circuit causes either the array output data or the compare data to be connected to the data output port of the directory memory system. The logic outputs of the two groups of compare data logic circuits are connected to two compare-data-out logic circuits whose outputs are two bytes of data, each bit of which indicates whether one of the compare data bytes is identical to the selected data from each of the subarrays. The bit select circuits provide a means for electrically disconnecting the subarrays from the array data output bus, thus data may simultaneously be written into the subarrays while comparing the subarray data with two bytes of compare data, or while comparing the subarray data with one byte of compare data and bypassing the other byte of compare data to the memory system data output port. In addition, data may be read from a selected subarray and outputted from the memory system data output port while simultaneously comparing two bytes of compare data therewith.

BRIEF DESCRIPTION OF THE DRAWINGS

Other objects and many of the attendant advantages of the present invention will be better understood by reference to the following detailed description in conjunction with the accompanying drawings, in which like reference numerals designate the same or similar parts throughout the several views, and wherein.

DETAILED DESCRIPTION OF THE PREFERRED EMBODIMENTS

Figure 1A:
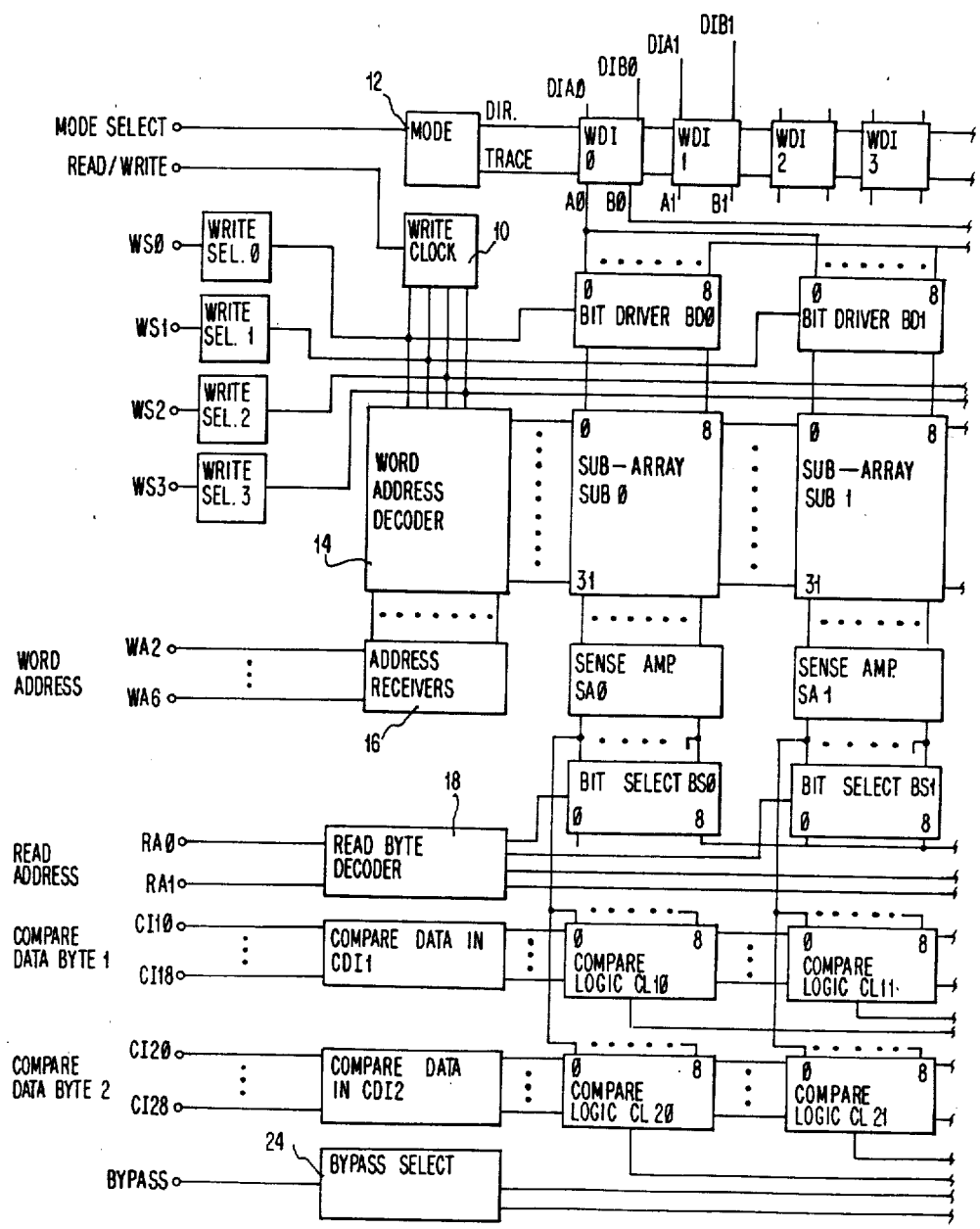
FIGS. 1A and 1B form a block diagram of a directory memory system according to one embodiment of the present invention.
Figure 1B:
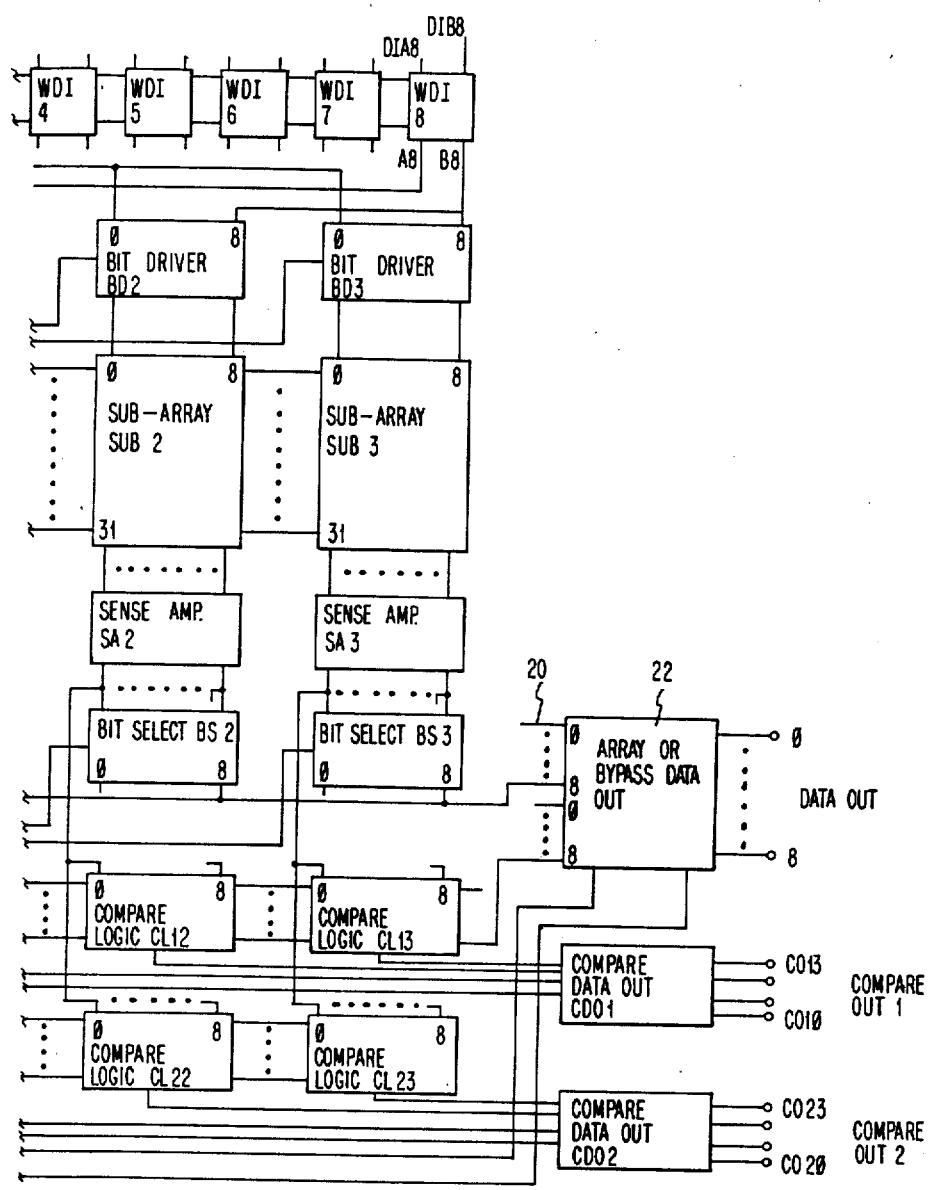

Referring now to the drawings, there is shown in FIGS. 1A and 1B a block diagram of a directory memory system according to one embodiment of the present invention including a memory block formed of an array of cells divided into four subarrays SUB0-SUB3, each subarray having 32 rows numbered 0-31 and 9 columns numbered 0-8. In this 32×9 configuration each subarray can store 32 9-bit words. It is to be understood that this configuration is for purposes of illustration only, and that the present invention may be applied to other memory array configurations merely by modifying the arrangement and number of the associated elements which will be described in greater detail below.

Connected to the input of each subarray is a bit driver BD0-BD3 which functions as a buffer and allows data to be input to each subarray individually or in various combinations. Bit drivers BD0-BD3 are enabled by write select signals WS0-WS3 in combination with a write clock 10. Write clock 10, in turn, is enabled by a READ/WRITE signal so that when this signal is a logic 0 input data can be gated through the selected bit drivers BD0-BD3 into subarrays SUB0-SUB3. When READ/WRITE is a logic 1 the memory system is in a read mode. Array input data, designated DATA IN in FIGS. 1A and 1B, is applied to the inputs of nine write-data-in circuits WD0-WD8 whose outputs are connected to the inputs of bit drivers BD0-BD3. The format or organization in which the array input data is presented to bit drivers BD0-BD3 is controlled by a MODE SELECT signal through logic circuit MODE 12 which is connected to each write-data-in circuit WD0-WD8. In the present configuration, array input data is organized in two 9-bit bytes, DIA and DIB. A corresponding bit from each byte of array input data is connected to the input of each write-data-in circuit. For example, the first bits DIA0 and DIB0 of each byte are connected to WD0, the second bits DIA1 and DIB1 are connected to WD1, and so forth. Each write-data-in circuit has two outputs A and B, with output A being connected to bit drivers BD0 and BD1, and output B being connected to bit drivers BD2 and BD3. This permits array input data to be written into subarrays SUB0-SUB3 in either a 128×9, a 64×18, or a 32×(2×18) organization as will be described below. The write-data-in circuitry disclosed in copending application Ser. No. 611,564, cited above and incorporated herein by reference, may advantageously be used in the present memory system.

The 32 rows in each subarray SUB0-SUB3 are selected by a word address decoder 14 connected to each subarray in parallel, so that the same row is simultaneously addressed in all four subarrays. The row select information is contained in a 5-bit WORD ADDRESS signal. The five bits, designated WA2-WA6, are applied to address receivers 16 which are connected to word address decoder 14. A suitable word addressing scheme and the associated circuitry are described in U.S. Pat. No. 4,460,984 entitled "Memory Array with Switchable Upper and Lower Word Lines" to R. W. Knepper, of common assignee herewith, which is incorporated herein by reference.

The outputs of subarrays SUB0-SUB3 are connected to sense amplifier circuits SA0-SA3, respectively, which determine the contents of the selected memory cells during a read operation. The outputs of SA0-SA3 are connected to the inputs of bit select logic BS0-BS3, compare logic CL10-CL13, and compare logic CL20-CL23. SA0 is connected to BS0, CL10 and CL20; SA1 is connected to BS1, CL11 and CL21; SA2 is connected to BS2, CL12 and CL22; and SA3 is connected to BS3, CL13 and CL23. Thus, the selected 9-bit word from a subarray appears at the output of its corresponding sense amplifier and simultaneously at the inputs of the corresponding bit select logic and the two compare logic circuits.

Each bit select logic circuit BS0-BS3 has an enable input connected to a read byte decoder 18 so that only one of the circuits BS0-BS3 is enabled at a time. Two bits designated RA0 and RA1 from a READ ADDRESS signal determine which of the four bit select logic circuits is enabled. The READ ADDRESS and WORD ADDRESS signals may be combined in a single 7-bit byte to provide both array word selection and read byte selection. The outputs of bit select logic BS0-BS3 are connected to an array data output bus 20 which is connected to one set of inputs of an array/bypass data out circuit 22. The ouput of array/bypass circuit 22 is a 9-bit DATA OUT byte from the memory system data output port.

A first compare-data-in circuit CDI1 has a 9-bit output connected to a second set of data inputs of each of the first group of compare logic circuits CL10-CL13. Similarly, second compare-data-in circuit CDI2 is connected to the second group of compare logic circuits CL20-CL23. The input of CDI1 is a 9-bit (CI10-CI18) word COMPARE DATA BYTE 1, and the input of CDI2 is a 9-bit (CI20–CI28) word COMPARE DATA BYTE 2. The output of each compare logic circuit is a single bit which is a logic 0 if the two input bytes are identical on a bit-by-bit basis. For example, if the first input byte to compare logic CL10 from SA0 is identical to COMPARE DATA BYTE 1 the output from CL10 is a logic 0, while if the two bytes differ in one or more bits the output from CL10 is a logic 1. The outputs of CL10–CL13 are connected to a first compare-data-out circuit CD01 and the outputs of CL20–CL23 are connected to a second compare-data-out circuit CD02. The output of CD01 is a 4-bit (CO10–CO13) byte COMPARE OUT 1 which indicates whether the 9-bit COMPARE DATA BYTE 1 is identical to the selected words in subarrays SUB0–SUB3. The 4-bit (CO20–CO23) COMPARE OUT 2 byte indicates the comparison of COMPARE DATA BYTE 2 with the same selected words in subarrays SUB0–SUB3. For example, assume that COMPARE DATA BYTE 1 is identical to each of the four selected words in subarrays SUB0–SUB3. Then bits CO10–CO13 are all logic 0. If, however, COMPARE DATA BYTE 1 differs from the selected word in subarray SUB2, then the third bit CO12 of COMPARE OUT 1 would be a logic 1.

The 9-bit output of compare-data-in logic CDI1 is also connected to a second set of data inputs of array/bypass data out circuit 22, and the output of a bypass select logic circuit 24 is connected to the enable inputs of array/bypass circuit 22. Upon receipt of a BYPASS signal, bypass select logic 24 causes the second set of data inputs of array/bypass circuit 22, i.e., the data from CDI1, to be connected to the array/bypass 22 output. In other words, the BYPASS signal causes the 9-bit word COMPARE DATA BYTE 1 to appear at the DATA OUT port of the memory system in place of the selected word one of the subarrays SUB0–SUB3. In the illustrated configuration only the word COMPARE DATA BYTE 1 may be bypassed to the DATA OUT port, although it will be understood by those skilled in the art that the present configuration may easily be modified to selectively bypass either of the compare input words to the DATA OUT port.

Figure 2:
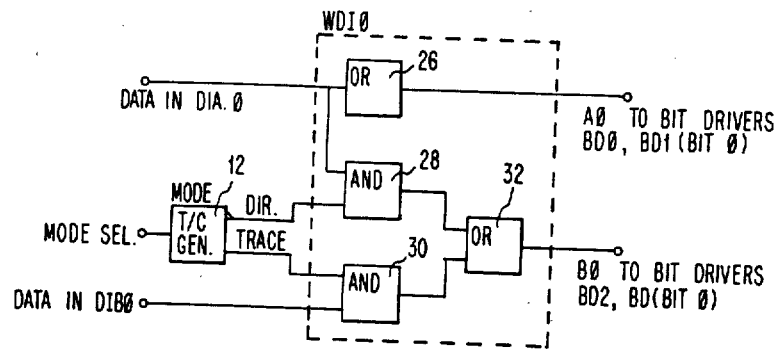
FIG. 2 is a logic diagram of one of the write-data-in circuits in the memory system of FIGS. 1A and 1B.

Referring now to FIG. 2, there is shown a schematic logic diagram of one of the write-data-in circuits WDI0. The data inputs to WDI0 are bits DIA0 and DIB0 from the two array data input bytes DIA and DIB at the DATA In port of the memory system. The two data outputs are A0, which is connected to the bit 0 inputs of bit drivers BD0 and BD1, and B0, which is connected to the bit 0 inputs of bit drivers BD2 and BD3. Bit DIA0 is connected to the input of an OR gate 26 whose output is bit A0, and to one input of an AND gate 28. Bit DIB0 is connected to one input of an AND gate 30. The MODE 12 logic is a true/complement generator whose input is the MODE SELECT signal and whose outputs are the DIRECTORY and TRACE signals. The DIRECTORY signal is connected to the second input of AND 28 and the TRACE signal is connected to the second input of AND 30. The outputs of AND 28 and AND 30 are connected to the inputs of an OR gate 32, the output of which is bit B0. In operation, in the DIRECTORY mode the MODE SELECT signal is a logic 0, the DIRECTORY signal is a logic 1, and the TRACE signal is a logic 0, which enables AND 28 and disables AND 30. This causes the bit DIA0 to appear at both the A0 and the B0 outputs of WDI0, and DIA0 may thus be written into all four subarrays SUB0–SUB3 when bit drivers BD0–BD3 are also enabled. In the TRACE mode the MODE SELECT signal is a logic 1, the DIRECTORY signal is a logic 0, and the TRACE signal is a logic 1 which enables AND 30 and disables AND 28. In this mode bit DIA0 appears at output A0 and bit DIB0 appears at output B0. Bit DIA0 may then be written in subarrays SUB0 and SUB1, and bit DIB0 may be written into subarrays SUB2 and SUB3. The structure of the other eight circuits WDI1–WDI8 are identical to that of write-data-in circuit WDI0.

Figure 3:
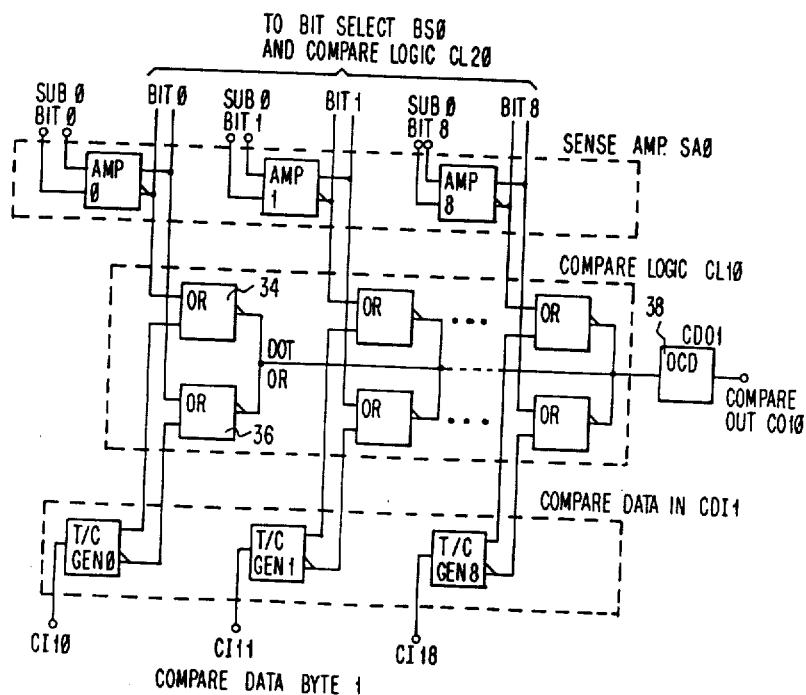
FIG. 3 is a schematic logic diagram showing the interconnection details of one of the compare logic circuits of the memory system of FIGS. 1A and 1B.

FIG. 3 shows the circuitry and interconnection of the sense amplifier, compare logic and compare-data-in circuits in greater detail. For clarity of illustration, only the logic associated with subarray SUB0 is shown, however, the other sense amplifier, compare logic and compare-data-in circuits associated with subarrays SUB1–SUB3 are identical in structure and operation. Sense amplifier SA0 is formed of nine differential type amplifiers AMP0–AMP8. The inputs of AMP0 are the bit 0 lines from subarray SUB0, the inputs of AMP1 are the bit 1 lines from subarray SUB0, and so forth. The true output of AMP0 is connected to one input of an OR gate 36 and the complement output of AMP0 is connected to one input of an OR gate 34, the OR gates 34, 36 forming a portion of compare logic CL10. The outputs of AMP0–AMP8 are also connected to the inputs of bit select logic BS0 and compare logic CL20. Compare-data-in circuit CDI1 is formed of nine true/complement generators T/C GEN0–T/C GEN8, the inputs of which are bits CI10–CI18 of word COMPARE DATA BYTE 1. The true output of T/C GEN0 is connected to a second input of OR 34 and the complement output of T/C GEN0 is connected to a second input of OR 36. The outputs of OR 34 and OR 36 are inverted and connected together and to the outputs of the other pairs of OR gates in CL10 as shown in FIG. 3, to form a "DOT OR" logical function. The DOT OR function may be thought of as a combination of a NOR and an AND function. In operation, if bit 0 from subarray SUB0 is a logic 1, then the true and complement outputs of AMP0 are logic 1 and 0, respectively, one input to OR 34 is logic 0, and one input to OR 36 is a logic 1. If bit CI10 of COMPARE DATA BYTE 1 is also a logic 1, then the true output of T/C GEN0 in CDI1 is logic 1 and the complement output is logic 0 so that the other inputs of OR 34 and OR 36 are logic 1 and 0, respectively. The outputs of OR 34 and OR 36 are both logic 0, indicating that bit 0 of the word in subarray SUB0 and bit CI10 (bit 0) of COMPARE DATA BYTE 1 are identical. The result is the same if bit 0 in each word is a logic 0. If the bits are different, then the output of either OR 34 or OR 36 will be a logic 1, indicating that a "non-compare" state exists between the two bytes. The combined outputs of the OR gates in compare logic CL10 are connected to one of nine off-chip drivers OCD 38 in compare-data-out circuit CD01. The output of OCD 38 is bit CO10 of the COMPARE OUT 1 byte. To summarize, if one or more of the bits in the selected word from subarray SUB0 does not match the corresponding bits in COMPARE DATA BYTE 1, then bit CO10 of the COMPARE OUT 1 byte will be a logic 1. In a similar manner, if one or more bits in the word from subarray SUB0 does not match the corresponding bits in COMPARE DATA BYTE 2, then bit CO20 of the COMPARE OUT 2 byte will be a logic 1.

Figure 4:
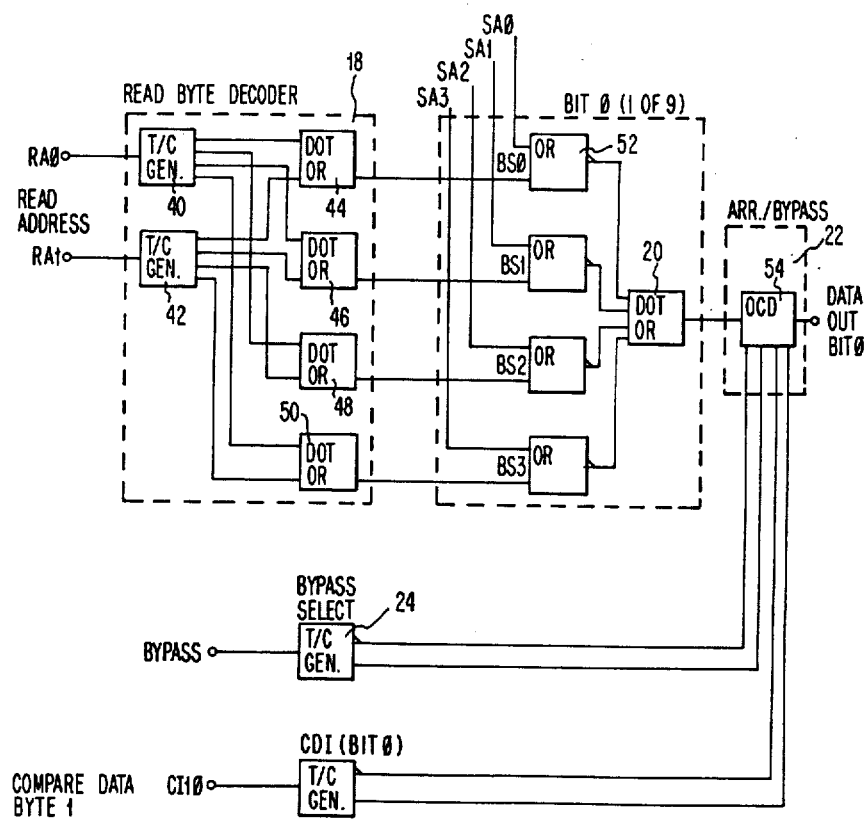
FIG. 4 is a schematic logic diagram showing the interconnection and structure of the read byte decoder, the bit select logic, and the bypass logic.

FIG. 4 shows the interconnection and structure of read byte decoder 18 and the bit select and bypass logic in greater detail. Read byte decoder 18 is formed of two true/complement generators 40 and 42 connected to four DOT OR logic circuits 44, 46, 48 and 50. The DOT OR logic function is similar to that described above in connection with the compare logic operation. The inputs to generators 40 and 42 are READ ADDRESS bits RA0 and RA1, respectively. In this configuration, only one of the four DOT OR gates 44-50 will be selected depending upon the logic levels of bits RA0 and RA1. The selected DOT OR gate output is a logic 0, while the outputs of the non-selected DOT OR gates are logic 1, Each of the four read byte decoder 18 outputs, i.e., the outputs of DOT OR circuits 44-50, is connected to one of the bit select logic circuits BS0-BS3. The output of DOT OR 44 is connected to one input of an OR gate 52 in bit select logic BS0, the other input of which is connected to bit 0 from sense amplifier SA0. The output of OR 52 is inverted and combined with the outputs of similar OR gates in the other bit select logic circuits BS1-BS3 in a DOT OR logic gate which performs the function of the array data output bus 20. Each bit from the array data output bus 20 is connected to a selectable output off-chip driver OCD 54 (one of nine shown) in the array/bypass logic 22. The output of OCD 54 is bit 0 of the DATA OUT word. There are nine OR gates in each of the bit select logic circuits BS0-BS3, nine DOT OR logic gates in the array data output bus 20, and nine selectable OCD logic gates 54 in the array/bypass logic 22. Bypass select logic 24 and each of the nine bits in COMPARE DATA BYTE 1 are also connected to the off-chip drivers OCD 54 in array/bypass logic 22, as described above.

The logic functions and combinations thereof provided by the present memory system are summarized below.

WRITE DATA IN

The memory array, formed of subarrays SUB-0-SUB3, can be organized as a 128×9, 64×18, or 32×(2×18) array for writing data in. In a DIRECTORY mode write operation the array is organized 128×9 by the write select signals WS0-WS3. which enable bit drivers BD0-BD3 one at a time. As described above, the MODE SELECT signal is a logic 0 and the array data input byte DIA appears at both the A and the B outputs of each of the line write-data-in circuits WDI0-WDI8 during each write cycle.

In the TRACE mode the array is organized 64×18 words by setting the MODE SELECT signal to a logic 1, which causes data input byte DIA to appear at the A outputs of WDI0-WDI8 and byte DIB to appear at the B outputs. The write select signals are enabled in pairs, WS0/WS2 and WS1/WS3, so that two subarrays are written simultaneously. All four subarrays SUB0-SUB3 can be written in 64 write cycles.

The array can be "purged", i.e., all of the memory cells in each subarray can be placed in a logic 1 or a logic 0 state, in 32 write cycles by writing the array in a 32×(2×18) organization. Each bit of data input bytes DIA and DIB is set either logic 0 or logic 1, WDI0-WDI8 are placed in the TRACE mode by setting the MODE SELECT signal to a logic 1, and write signals WS0-WS3 enable all four bit drivers BD0-BD3 simultaneously. The selected 9-bit word is then written into each subarray SUB0-SUB3 (36 bits total) simultaneously during each write cycle.

READ DATA OUT

The array is always read in a 128×9 organization by means of the read byte decoder 18 which enables one of the four bit select circuits BS0-BS3 at a time. The 9-bit word from the selected bit select circuit is placed on the array data output bus 20 and outputted from array/bypass logic 22 to the memory system data output port.

COMPARE DATA

Two 9-bit bytes of compare input data, COMPARE DATA BYTE 1 and COMPARE DATA BYTE 2, can be compared with the selected word line in the memory array. Since word address decoder 14 simultaneously selects a word in each of the four subarrays SUB-0-SUB3, up to eight compare operations can be performed at one time and the results outputted as two 4-bit bytes COMPARE OUT 1 and COMPARE OUT 2. A successful compare is indicated by a logic 0.

WRITE or READ/COMPARE

Both bytes of compare input data can be compared with the selected word line in the memory array during either a write or a read operation. During a READ/COMPARE operation, the contents of the selected address in a subarray appears at the DATA OUT port.

BYPASS DATA

The first byte of compare input data, COMPARE DATA BYTE 1, can be transferred to the DATA OUT port of the memory system by setting the BYPASS signal to logic 1. Bypass select logic 24 enables array/bypass logic 22 to electrically disconnect the array data output bus 20 and couple the 9-bit COMPARE DATA BYTE 1 directly to the DATA OUT port as described above.

COMPARE/BYPASS

Both bytes of compare input data, COMPARE DATA BYTE 1 and COMPARE DATA BYTE 2, can be compared with the selected word line in subarrays SUB0-SUB3 while simultaneously performing the bypass operation, since the subarray output data is hardwired to the compare logic circuits CL10-CL13 and CL20-CL23.

WRITE/COMPARE/BYPASS

The above COMPARE or the COMPARE/BYPASS operations can be performed simultaneously with an array write operation since the subarray output data always appears at the inputs of the compare logic circuits, i.e., the sense amplifier SA0-SA3 outputs are hardwired to the compare logic CL10-CL13 and CL20-CL23 inputs.

The above described directory memory system provides various combinations of logic functions in a single monolithic integrated circuit as compared to memory systems heretofore available which required a plurality of integrated circuit chips to perform the same combination of functions. Further, fewer circuit elements are required, which increases the speed of the overall data processing system in which the present memory system is employed. It will be apparent to those skilled in the art that this system is versatile in that the number and size of subarrays, the number of compare data input words, and the array data write organizations can be readily modified depending upon the desired application.

While the present invention has been particularly shown and described with reference to preferred embodiments, it will be understood by those skilled in the art that changes in form and details may be made

What is claimed is:

1. An integrated circuit memory system comprising:
   an array of memory cells divided into a plurality of subarrays;
   sense amplifier means for sensing the contents of selected cells in said subarrays;
   compare logic means connected to said sense amplifier means for comparing the contents of said selected cells in said subarrays with compare input data;
   data output means connected to said sense amplifier means;
   decode means connected to said sense amplifier means for connecting the output of a selected one of said subarrays to said data output means;
   a plurality of write data input means each connected to array input data and to at least two of said subarrays; and
   a plurality of write select means each connected to one of said subarrays, wherein selected portions of said array input data may be simultaneously written into selected of said subarrays and compared with said compare input data.

2. The memory system of claim 1, further comprising:
   mode select means connected to said plurality of write data input means, wherein selected portions of said array input data may be replicated at the outputs of said write data input means and written into selected of said subarrays.

3. The memory system of claim 2, further comprising:
   bypass means for electrically disconnecting said sense amplifier means from said data output means and for electrically connecting selected portions of said compare input data to said data output means, wherein said selected portions of said compare input data are outputted from said data output means while other selected portions of said compare input data are simultaneously compared with selected cells of a subarray.

4. The memory system of claim 3, further comprising:
   a plurality of write data input means each connected to array input data and to at least two of said subarrays; and
   a plurality of write select means each connected to one of said subarrays, wherein selected portions of said array input data may be simultaneously written into selected subarrays.

5. The memory system of claim 4, further comprising:
   mode select means connected to said plurality of write data input means, wherein selected portions of said array input data may be replicated at the outputs of said write data input means and written into selected subarrays.

6. An integrated circuit memory system comprising:
   an array of memory cells;
   sense amplifier means for sensing the contents of selected cells in said array;
   data output means connected to said sense amplifier means;
   compare logic means connected to said sense amplifier means and to said data output means for comparing the contents of said selected cells in said array with compare input data; and
   bypass means for electrically disconnecting said sense amplifier means from said data output means and for electrically connecting said compare input data to said data output means, wherein said compare input data is outputted from said data output means.

7. The memory system of claim 6 wherein said array of memory cells is divided into a plurality of subarrays, further comprising:
   decode means connected to said sense amplifier means for connecting the output of a selected one of said subarrays to said data output means.

8. The memory system of claim 7, further comprising:
   a plurality of write data input means each connected to array input data and to at least two of said subarrays; and
   a plurality of write select means each connected to one of said subarrays, wherein selected portions of said array input data may be simultaneously written into selected subarrays.

9. The memory system of claim 8, further comprising:
   mode select means connected to said plurality of write data input means, wherein selected portions of said array input data may be replicated at the outputs of said write data input means and written into selected subarrays.

10. An integrated circuit memory system comprising:
    an array of memory cells;
    sense amplifier means for sensing the contents of selected cells in said array;
    data output means connected to said sense amplifier means;
    compare logic means connected to said sense amplifier means and to said data output means for comparing the contents of said selected cells in said array with compare input data; and
    bypass means for electrically disconnecting said sense amplifier means from said data output means and for electrically connecting selected portions of said compare input data to said data output means, wherein said selected portions of said compare input data are outputted from said data output means while other selected portions of said compare input data are simultaneously compared with said selected cells of said memory array.

11. The memory system of claim 10 wherein said array of memory cells is divided into a plurality of subarrays, further comprising:
    decode means connected to aid sense amplifier means for connecting the output of a selected one of said subarrays to said data output means.

12. The memory system of claim 11, further comprising:
    a plurality of write data input means each connected to array input data and to at least two of said subarrays; and
    a plurality of write select means each connected to one of said subarrays, wherein selected portions of said array input data may be simultaneously written into selected subarrays.

13. The memory system of claim 12, further comprising:
    mode select means connected to said plurality of write data input means, wherein selected portions of said array input data may be replicated at the outputs of said write data input means and written into selected subarrays.